US012708096B2

(12) United States Patent
Marotta

(10) Patent No.: US 12,708,096 B2
(45) **Date of Patent: *Aug. 18, 2026**

(54) EQUIPMENT FOR THE PRODUCTION OF STUFFED CHEESE, PARTICULARLY BURRATA CHEESE

(71) Applicant: Marotta Evolution S.r.l., Nonantola (IT)

(72) Inventor: Carmine Marotta, Casalecchio di Reno (IT)

(73) Assignee: Marotta Evolution S.r.l., Nonantola (IT)

( * ) Notice: Subject to any disclaimer, the term of this patent is extended or adjusted under 35 U.S.C. 154(b) by 1110 days.

This patent is subject to a terminal disclaimer.

(21) Appl. No.: 17/775,597

(22) PCT Filed: May 20, 2020

(86) PCT No.: PCT/IB2020/054769

§ 371 (c)(1),
(2) Date: May 10, 2022

(87) PCT Pub. No.: WO2021/094839

PCT Pub. Date: May 20, 2021

(65) Prior Publication Data

US 2022/0400645 A1 Dec. 22, 2022

(30) Foreign Application Priority Data

Nov. 11, 2019 (IT) ........................ 102019000020823

(51) Int. Cl.
*A01J 25/00* (2006.01)
*A01J 25/12* (2006.01)

(52) U.S. Cl.
CPC ............ *A01J 25/008* (2013.01); *A01J 25/12* (2013.01)

(58) Field of Classification Search
CPC ................................ A01J 25/12; A01J 25/008
(Continued)

(56) References Cited

U.S. PATENT DOCUMENTS 2,578,229 A * 12/1951 Clement .................. B21C 3/06 396/510
2,712,693 A * 7/1955 Comparette ........... A01J 27/04 100/909
(Continued)

FOREIGN PATENT DOCUMENTS

| | | |
|---|---|---|
| DE | 272176 | 3/1914 |
| EP | 0280484 | 8/1988 |

(Continued)

OTHER PUBLICATIONS

Prima "Manual FB-2T Machine": 144P, 2014 (incl. English Machine Translation).
(Continued)

*Primary Examiner* — Jimmy Chou

(57) ABSTRACT

The equipment (1) for the production of stuffed cheese, particularly burrata cheese, comprises:

- one base frame (2);
- supporting means (3) for a cheese (C) of the fresh "pasta filata" type associated with the base frame (2);
- gripping means (6) for the cheese (C) associated with the base frame (2) and adapted to retain at least one portion (P) of the cheese (C);
- filling means (7) of the cheese (C) associated with the base frame (2) and adapted to inject a filling into the cheese (C) through the portion (P) to obtain a stuffed cheese (S);
- at least one mutual movement assembly (21) between the supporting means (3) and the gripping means (6); and (Continued)

at least one mutual movement unit (20) between the gripping means (6) and the filling means (7).

15 Claims, 9 Drawing Sheets

(58) Field of Classification Search
USPC .......... 99/494
See application file for complete search history.

(56) References Cited

U.S. PATENT DOCUMENTS

| | | | | | |
|---|---|---|---|---|---|
| 2,779,298 | A * | 1/1957 | Chwirut | A21C 11/163 | 425/DIG. 42 |
| 3,160,493 | A * | 12/1964 | Kuppers | C03B 7/11 | 30/223 |
| 3,457,880 | A * | 7/1969 | Eppenberger | A21C 11/16 | 366/156.2 |
| 3,572,259 | A * | 3/1971 | Hayashi | A21C 11/163 | 426/94 |
| 3,766,846 | A * | 10/1973 | Jimenez | A47J 37/1214 | 99/427 |
| 3,807,919 | A * | 4/1974 | Kaufman, Jr. | A23P 30/25 | 425/133.1 |
| 3,880,065 | A * | 4/1975 | Stickle | A21B 5/08 | 99/404 |
| 3,901,641 | A * | 8/1975 | Onder | B30B 11/22 | 264/109 |
| 3,906,850 | A * | 9/1975 | Papai | A21C 9/04 | 99/450.7 |
| 3,945,785 | A * | 3/1976 | Belshaw | A21C 11/163 | 425/287 |
| 4,112,835 | A * | 9/1978 | Mongiello | A01J 25/12 | 99/466 |
| 4,251,201 | A * | 2/1981 | Krysiak | B30B 11/34 | 426/94 |
| 4,469,475 | A * | 9/1984 | Krysiak | B30B 11/221 | 99/450.6 |
| 4,511,318 | A * | 4/1985 | Kolodesh | A21C 7/04 | 426/94 |
| 4,589,833 | A * | 5/1986 | Hayashi | A21C 11/10 | 425/332 |
| 4,643,904 | A * | 2/1987 | Brewer | A21C 3/04 | 426/549 |
| 4,689,236 | A * | 8/1987 | Pinto | A21C 11/10 | 426/94 |
| 4,698,000 | A * | 10/1987 | Thulin | A23G 3/2015 | 425/DIG. 243 |
| 4,734,024 | A * | 3/1988 | Tashiro | A21C 11/00 | 426/503 |
| 4,752,488 | A * | 6/1988 | Hayashi | A21C 15/007 | 426/94 |
| 4,767,304 | A * | 8/1988 | Tashiro | A21C 11/103 | 264/157 |
| 4,767,305 | A * | 8/1988 | Tashiro | A21C 11/103 | 99/450.6 |
| 4,786,243 | A * | 11/1988 | Kehoe | A23G 4/043 | 426/516 |
| 4,794,009 | A * | 12/1988 | Dreisin | A23P 30/25 | 426/89 |
| 4,835,000 | A * | 5/1989 | Kehoe | A23G 4/043 | 426/516 |
| 4,854,842 | A * | 8/1989 | Kobayashi | A23P 30/25 | 425/168 |
| 4,882,185 | A * | 11/1989 | Simelunas | A21C 11/20 | 426/94 |
| 4,888,192 | A * | 12/1989 | Ramnarine | A23P 30/25 | 426/94 |
| 4,936,203 | A * | 6/1990 | Aoki | B65G 21/12 | 198/813 |
| 4,958,556 | A * | 9/1990 | Aquino | A21C 9/065 | 99/450.6 |
| 5,004,619 | A * | 4/1991 | Kobayashi | A23P 30/25 | 426/512 |
| 5,012,726 | A * | 5/1991 | Fehr | A21C 11/16 | 99/450.6 |
| 5,030,078 | A * | 7/1991 | Matthews | A23P 30/25 | 425/316 |
| 5,031,520 | A * | 7/1991 | Tsay | A21C 11/103 | 425/297 |
| 5,098,273 | A * | 3/1992 | Tashiro | A21C 11/103 | 425/142 |
| 5,153,010 | A * | 10/1992 | Tashiro | A21C 11/103 | 426/516 |
| 5,190,770 | A * | 3/1993 | Tashiro | B26D 5/08 | 425/142 |
| 5,223,277 | A * | 6/1993 | Watanabe | A21C 11/103 | 425/142 |
| 5,286,185 | A * | 2/1994 | Tashiro | A21C 3/02 | 425/319 |
| 5,403,528 | A * | 4/1995 | Fowler | B29B 9/16 | 264/237 |
| 5,458,055 | A * | 10/1995 | Fitch, Jr. | A21C 9/04 | 99/450.6 |
| 5,518,391 | A * | 5/1996 | Tashiro | A21C 11/103 | 83/672 |
| 5,558,896 | A * | 9/1996 | Kobayashi | A23P 30/25 | 426/503 |
| 5,643,617 | A * | 7/1997 | Burtscher | A21C 11/10 | 426/503 |
| 5,820,890 | A * | 10/1998 | Kobayashi | A21C 11/103 | 425/308 |
| 5,840,345 | A * | 11/1998 | Ayash | A21C 3/10 | 426/503 |
| 5,916,601 | A * | 6/1999 | Onoguchi | A21C 11/10 | 426/503 |
| 5,967,025 | A * | 10/1999 | Tashiro | A21C 11/00 | 99/450.2 |
| 6,053,097 | A * | 4/2000 | Suzuki | A23L 7/126 | 99/450.2 |
| 6,139,893 | A * | 10/2000 | Onoguchi | A21C 11/00 | 426/283 |
| 6,174,154 | B1 * | 1/2001 | Tashiro | A21C 11/103 | 425/142 |
| 6,183,171 | B1 * | 2/2001 | Ou-Young | A21C 11/103 | 407/113 |
| 6,234,779 | B1 * | 5/2001 | Ou-Young | A21C 11/103 | 425/142 |
| 6,257,863 | B1 * | 7/2001 | Otte | B29C 48/06 | 425/465 |
| 6,477,944 | B1 * | 11/2002 | Ou-Young | A21C 11/103 | 99/450.2 |
| 6,526,874 | B1 * | 3/2003 | Khatchadourian | A21D 6/003 | 222/146.2 |
| 6,558,721 | B1 * | 5/2003 | Parsons | A21C 9/04 | 118/308 |
| 6,817,850 | B2 * | 11/2004 | Kobayashi | A23P 20/20 | 99/450.6 |
| 8,192,777 | B2 * | 6/2012 | Burmester | A23G 9/285 | 426/100 |
| 8,827,683 | B2 * | 9/2014 | Kobayashi | A21C 11/103 | 425/287 |
| 9,022,768 | B2 * | 5/2015 | Schmidt | A23G 3/0027 | 425/207 |
| 9,277,753 | B2 * | 3/2016 | Bortone | A21C 11/163 | |
| 9,445,607 | B2 * | 9/2016 | Morikawa | A21C 9/063 | |
| 2001/0052372 | A1 * | 12/2001 | Hayashi | A21C 11/20 | 141/256 |
| 2003/0190391 | A1 * | 10/2003 | Kobayashi | A21C 9/063 | 426/297 |

FOREIGN PATENT DOCUMENTS

| | | |
|---|---|---|
| EP | 0713649 | 5/1996 |
| EP | 1380211 | 11/2004 |
| IT | 201800001009 | 7/2019 |

(56) References Cited

FOREIGN PATENT DOCUMENTS

| | | |
|---|---|---|
| JP | 5095874 | 12/2012 |
| TW | 200838443 | 10/2008 |

OTHER PUBLICATIONS

International Search Report and the Written Opinion Dated Sep. 14, 2020 From the International Searching Authority Re. Application No. PCT/IB2020/054769. (9 Pages).

* cited by examiner

A1≡A2
16
R
P
11
11
9
C
5
5b
4
S 1
26
26a
22a
24a
14
15
7
F
6
8
19b
19a
B
W
D
31
2
9
5
32
4
3

23≡25
16
22b
22a
14
24a
22
16
14
24a
16
22a
22b
23≡25
15
14
F
8
W
9
B
5
9
5
9
5
5

EQUIPMENT FOR THE PRODUCTION OF STUFFED CHEESE, PARTICULARLY BURRATA CHEESE

RELATED APPLICATIONS

This application is a National Phase of PCT Patent Application No. PCT/IB2020/054769 having International filing date of May 20, 2020, which claims the benefit of priority of Italy Patent Application No. 102019000020823 filed on Nov. 11, 2019. The contents of the above applications are all incorporated by reference as if fully set forth herein in their entirety.

FIELD AND BACKGROUND OF THE INVENTION

The present invention relates to a piece of equipment for the production of stuffed cheese, particularly burrata cheese.

Burrata cheese is a fresh pasta filata cheese, usually in the shape of a bag, containing a stuffing made up of fragments of fresh cheese and cream, also known as stracciatella.

The production process of the burrata cheese is manual and involves the initial hot processing of the pasta filata cheese in order to obtain a substantially spheroidal fresh cheese, known as mozzarella.

The mozzarella cheese is then retained, through a small portion, by an operator who inserts an injector for the delivery of the stuffing inside the mozzarella itself.

During delivery, the mozzarella cheese deforms to make room for the stuffing and acquires the characteristic bag shape.

After this operation has been completed, the operator seals the portion by applying a pressure force thereto; through this operation, the portion can be eventually removed from the burrata cheese depending on the shape to be given thereto.

Finally, the burrata cheese thus obtained is cooled and packaged.

It is easy to understand that this process is particularly labor-intensive and requires the use of skilled labor, since the operations must be carried out precisely and accurately to prevent the "bag" from spoiling, thus affecting the processing.

This inevitably leads to high production costs and consequently high prices for the final consumer.

In addition, the process involves rather long processing times which can affect the quality of fresh cheeses which, in order to maintain their quality almost unchanged, need to be placed on the market within a short time from their production.

Furthermore, the risk of contamination associated with the manual processing of these fresh cheeses should not be underestimated, which may, in turn, affect the quality of the finished product.

It is important to point out that changes in the quality of these fresh cheeses affect significantly customer's satisfaction, who may be discouraged to repeat the purchase of the product.

It is clear, therefore, that the production process of this stuffed cheese is open to improvement.

SUMMARY OF THE INVENTION

The main aim of the present invention is to devise a piece of equipment for the production of stuffed cheese, particularly burrata cheese, that allows reducing the processing time and costs related thereto.

Another object of the present invention is to devise a piece of equipment for the production of stuffed cheese, particularly burrata cheese, that allows freeing from the use of skilled labor.

A further object of the present invention is to devise a piece of equipment for the production of stuffed cheese, particularly burrata cheese, that allows minimizing the risk of bacterial contamination.

Another object of the present invention is to devise a piece of equipment for the production of stuffed cheese, particularly burrata cheese, that allows overcoming the aforementioned drawbacks of the prior art within a simple, rational, easy, effective to use and affordable solution.

The objects set out above are achieved by the present equipment for the production of stuffed cheese, particularly burrata cheese, having the characteristics of claim 1.

BRIEF DESCRIPTION OF THE SEVERAL VIEWS OF THE DRAWINGS

Other characteristics and advantages of the present invention will be more evident from the description of a preferred, but not exclusive, embodiment of a piece of equipment for the production of stuffed cheese, particularly burrata cheese, illustrated by way of an indicative, yet non-limiting example in the attached tables of drawings in which.

DESCRIPTION OF SPECIFIC EMBODIMENTS OF THE INVENTION

Figure 1:
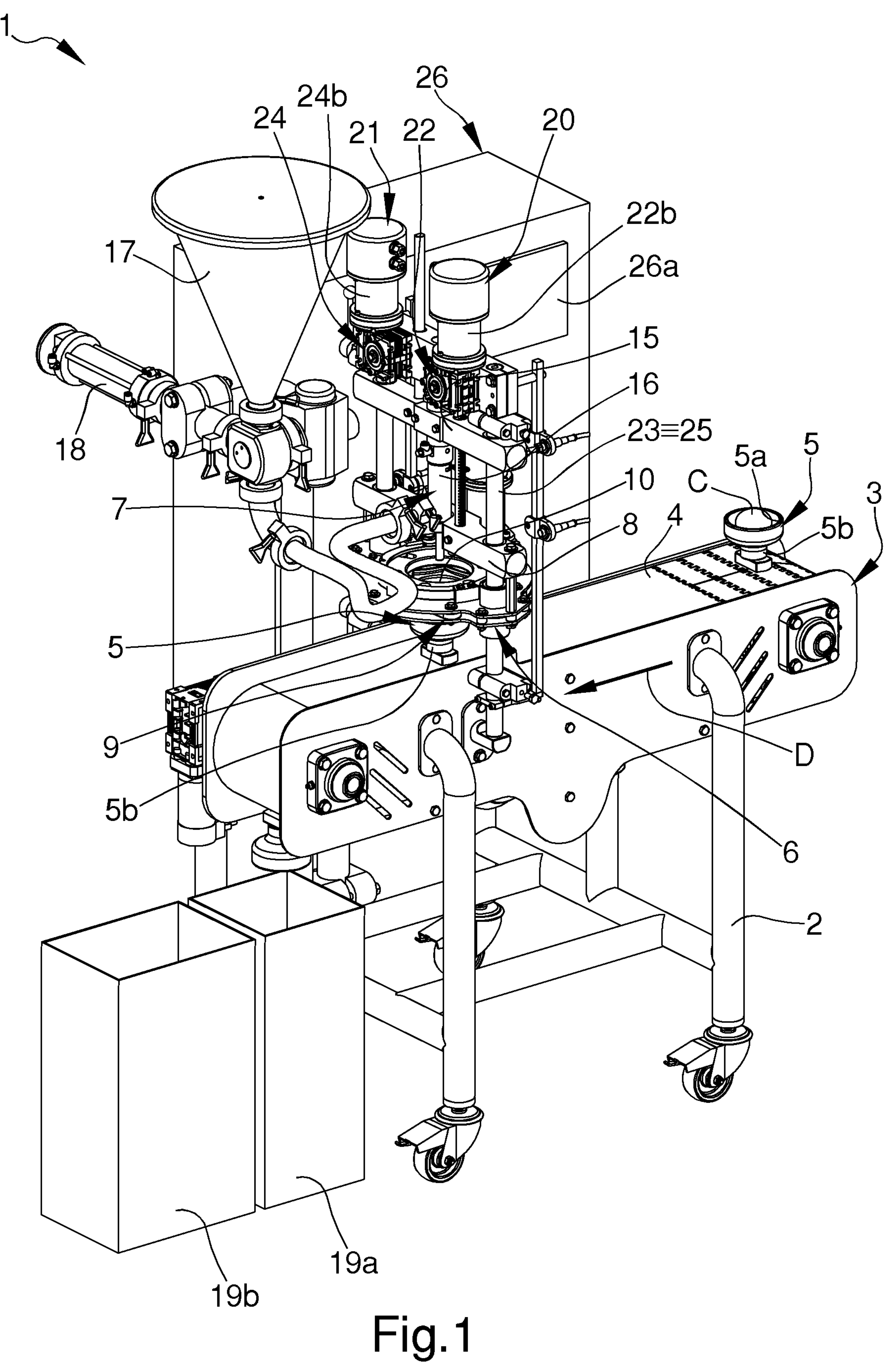
FIG. 1 is an axonometric view of a first embodiment of the equipment according to the invention.

With particular reference to these figures, reference numeral 1 globally indicates a piece of equipment for the production of stuffed cheese, particularly burrata cheese.

The equipment 1 according to the invention comprises at least one base frame 2 and supporting means 3 for a cheese C of the "pasta filata" type, which are associated with the base frame 2.

In particular, the cheese C is of the mozzarella type.

The possibility of using a different type of "pasta filata" cheese, e.g. scamorza, cannot however be ruled out.

The cheese C undergoes hot processing to allow the introduction of a stuffing to obtain a stuffed cheese S, in this case a burrata cheese.

In particular, the stuffing comprises one or more fresh dairy products, specifically, fragments of mozzarella and cream.

The use of different types of dairy products (e.g. cottage cheese, butter, etc.) and/or with added non-dairy ingredients cannot however be ruled out for the production of different types of stuffed cheese S.

The supporting means 3 conveniently comprise a supporting plane 4 movable on the base frame 2 along a direction of forward movement D.

In the embodiment shown in the figures, the supporting plane 4 is of the type of a conveyor belt and the direction of forward movement D is substantially linear. It cannot however be ruled out that the supporting plane 4 may be of the type of a rotary carousel with a substantially circular direction of forward movement D. Other embodiments wherein the supporting plane 4 is stationary cannot be ruled out.

The supporting means 3 comprise at least one container element 5 of the cheese C associated with the supporting plane 4 and adapted to accommodate the cheese C.

In this case, the container element 5 is of the type of a cup and is provided with a housing 5*a* of the cheese C and with a stem 5*b* which helps to move the housing itself away from the supporting plane 4.

The container element 5, e.g., can be made of a thermally insulating material so that the temperature of the cheese C can be maintained, which cheese requires to be hot processed.

Alternatively, the container element 5 can be made of a metal material with minimal heat resistance and capable of rapidly reaching the temperature of the cheese C.

The movement of the supporting plane 4 is of the discrete type and allows the positioning of the container element 5 between a loading station of the cheese C, a filling station of the cheese C, and an unloading station of the stuffed cheese S.

In particular, in the loading station, the cheese C is placed inside the housing 5*a* of the container element 5.

At the filling station, the equipment 1 is provided with gripping means 6 for gripping the cheese C which are associated with the base frame 2 and adapted to retain at least one portion P of the cheese C, and with filling means 7 of the cheese C associated with the base frame 2 and adapted to inject a filling into the cheese C through the portion P to obtain the stuffed cheese S.

Conveniently, the supporting means 3 comprises a plurality of container elements 5 associated with the supporting plane 4 and adapted to house a plurality of cheeses C.

The container elements 5 are arranged in a sequence along the direction of forward movement D.

In more detail, the container elements 5 are arranged on the supporting plane 4 at defined distances, in such a way that when a container element 5 is in the unloading station, there is a subsequent one arranged at the filling station.

This embodiment allows producing stuffed cheese S in a continuous cycle and without the need for the container element 5 to unload the stuffed cheese S before starting a new cycle.

The filling means 7 will be described in detail later on in this discussion.

The gripping means 6 comprise at least one gripping frame 8 associated with the base frame 2 and at least one diaphragm device 9, associated with the gripping frame 8 and closable around the cheese C to retain the portion P and openable to release the stuffed cheese S.

In particular, the diaphragm device 9 defines a passage hole 10 through which the cheese C can pass.

The closure of the diaphragm device 9 causes a gradual closure of the passage hole 10 until the cheese C is intercepted.

Advantageously, the diaphragm device 9 comprises a plurality of gripping elements 11 associated with the gripping frame 8, arranged along a circumference.

Specifically, the gripping elements 11 are arranged to surround the passage hole 10 and are mutually movable in rotation around their respective axes of rotation R between at least one working position, wherein they are approached to the centre of the circumference to intercept the cheese C and retain the portion P, and at least one home position, wherein they are moved away from the centre to release the cheese C.

In other words, the gripping elements 11 move at the same time in a concentric manner to intercept the portion P and keep the cheese C stationary.

In addition, the diaphragm device 9 is provided with rotational means 12 of the gripping elements 11 between at least the working position and the home position, comprising at least one connecting element 13 associated with the gripping elements 11.

The connecting element 13 has a substantially circular shape, is arranged on top of the gripping elements 11 and comprises a plurality of slots 13*a*, arranged along the circumference, each associated with a corresponding pin Ila defined on a respective gripping element 11.

In more detail, the pin 11*a* is accommodated in a sliding manner inside the slot 13*a*, the shape of which determines the movement trajectory of the pin Ila and thus the amplitude of rotation of the gripping element 11 around the respective axis of rotation R.

The rotational means 12 comprises at least one actuating body 14 operationally connected to the connecting element 13 by means of a gear wheel 14*a* adapted to mesh on a respective toothed portion 13*b* defined on the connecting element itself.

The rotation of the gear wheel 14*a* in the two directions of rotation determines the movement of the gripping elements 11 between the working position and the home position.

Specifically, the rotation of the connecting element 13 determines the displacement of the slots 13*a* which in turn drive the respective pins Ila and transfer the movement to the gripping elements 11.

In addition, the gripping elements 11 can be conveniently moved towards a sealing position wherein the passage hole 10 is further closed and wherein the gripping elements 11 apply a pressure force on the portion P in order to firmly close the stuffed cheese S.

The gripping elements 11 can also be moved further towards a cutting position wherein the passage hole 10 is completely closed; in the cutting position, the gripping elements 11 determine the detachment of the portion P from the stuffed cheese S.

The equipment 1 allows, in actual facts, the production of stuffed cheese S provided with the characteristic "bag" shape and/or stuffed cheese S having a spheroidal shape, wherein the portion P is removed from the stuffed cheese S.

After detachment, the portion P remains on the diaphragm device 9 until the next movement of the gripping elements 11 towards the home position, wherein it is deposited on the supporting plane 4 by gravity.

Conveniently, the equipment 1 may comprise a plurality of diaphragm devices 9, arranged in a concentric manner and independently operable depending on the type of stuffed cheese S to be obtained.

For example, on the basis of the size of the stuffed cheese S to be obtained, two identical diaphragm devices 9 arranged on top of each other may be used; in the case of the production of a small stuffed cheese S, only one diaphragm device 9 is operated in order to retain a reduced portion P; whereas, for the production of a larger stuffed cheese S, it will be necessary to retain a larger portion P and both the diaphragm devices 9 will be operated at the same time.

Alternatively or in combination therewith, one of the diaphragm devices 9 may comprise gripping elements 11 provided with a sharp portion adapted to easily remove the portion P after filling the cheese C; in such a case, the equipment 1 comprises at least one diaphragm device 9 adapted to seal the portion P and at least one diaphragm device 9 adapted to remove it.

Alternatively or in combination with the diaphragm device 9, the gripping means 6 may comprise a gripper device associated with the gripping frame 8 and movable to retain and/or seal the cheese C and/or to remove the portion P from the stuffed cheese S.

As mentioned above, the equipment 1 comprises filling means 7 adapted to inject the stuffing into the cheese C.

The filling means 7 comprise at least one filling frame 15 associated with the base frame 2 and at least one injector device 16 associated with the filling frame 15 and adapted to inject the stuffing into the cheese C.

Conveniently, the equipment 1 also comprises at least one tank 17 adapted to contain the stuffing, which is connected in a fluid-operated manner to the injector device 16 and at least one pumping device 18 adapted to transfer the stuffing from the tank 17 to the injector device 16.

In more detail, the injector device 16 is partly inserted into the cheese C through the portion P, suitably retained by the gripping means 6, and delivers the stuffing, contained in the tank 17, into the cheese C.

As a result of filling, the injector device 16 is pulled out of the portion P to obtain the stuffed cheese S and the gripping means seal and possibly remove the portion P.

The stuffed cheese S obtained this way is released from the gripping means 6 and transferred towards the unloading position; in particular, the gripping elements 11 are moved towards the home position to free the passage hole 10.

During this operation, any removed portion P is released on the supporting plane 4 to allow it to be moved away, together with the stuffed cheese S, from the stuffing station towards the unloading station.

The equipment 1 comprises at least one cooling tub 19*a*, 19*b*, located at the unloading station, inside which the stuffed cheese S is transferred.

In particular, as shown in the figures, at the unloading station, the supporting plane 4 causes the container element 5 to overturn, thus causing the stuffed cheese S to fall into the cooling tub 19*a*, 19*b*.

The cooling tub 19*a*, 19*b* comprises a first tub 19*a* adapted to contain the portions P and a second tub 19*b* adapted to contain the stuffed cheese S.

Figure 2:
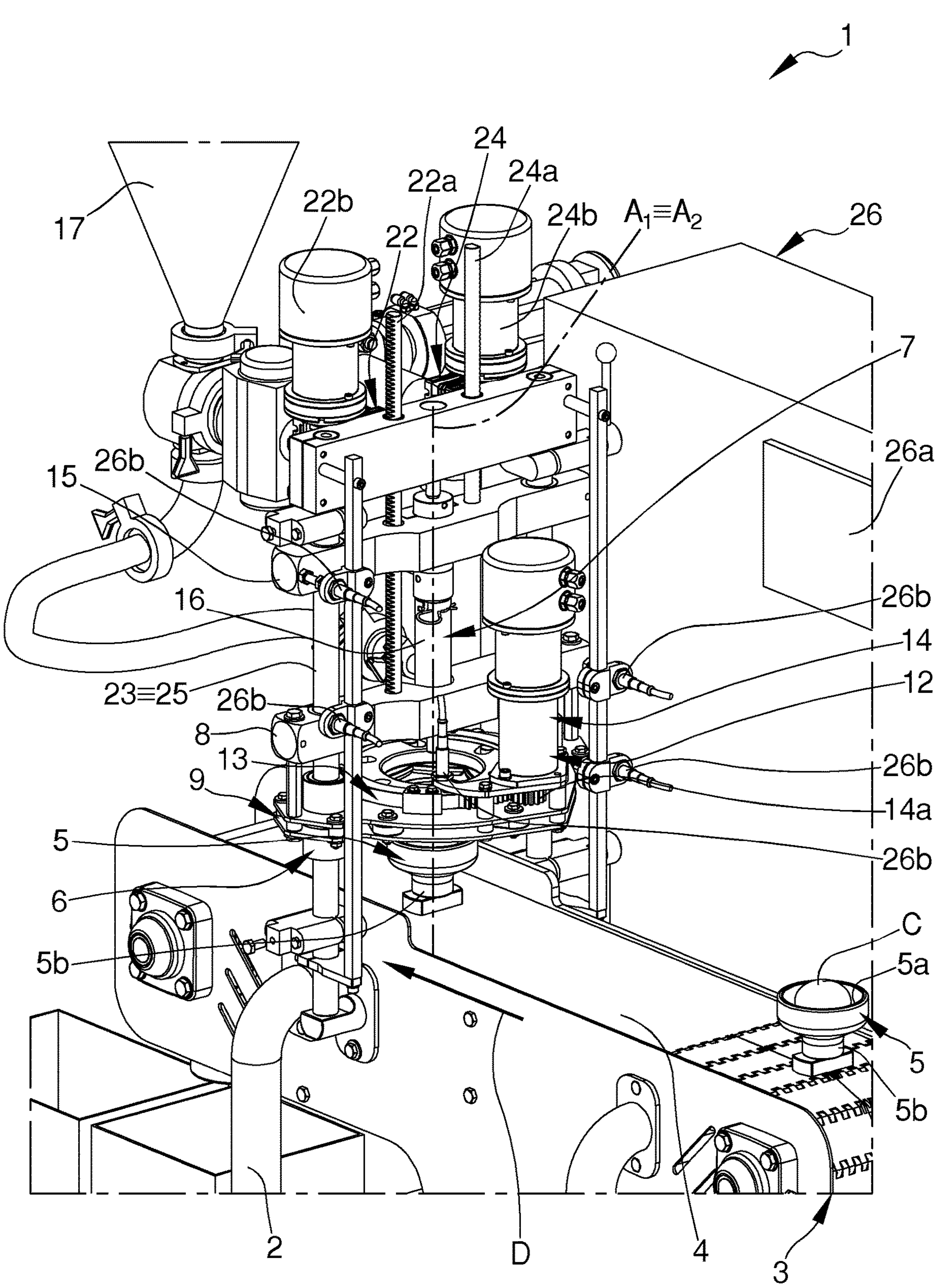
FIG. 2 is a detailed axonometric view of the equipment in FIG. 1.
Figure 3:
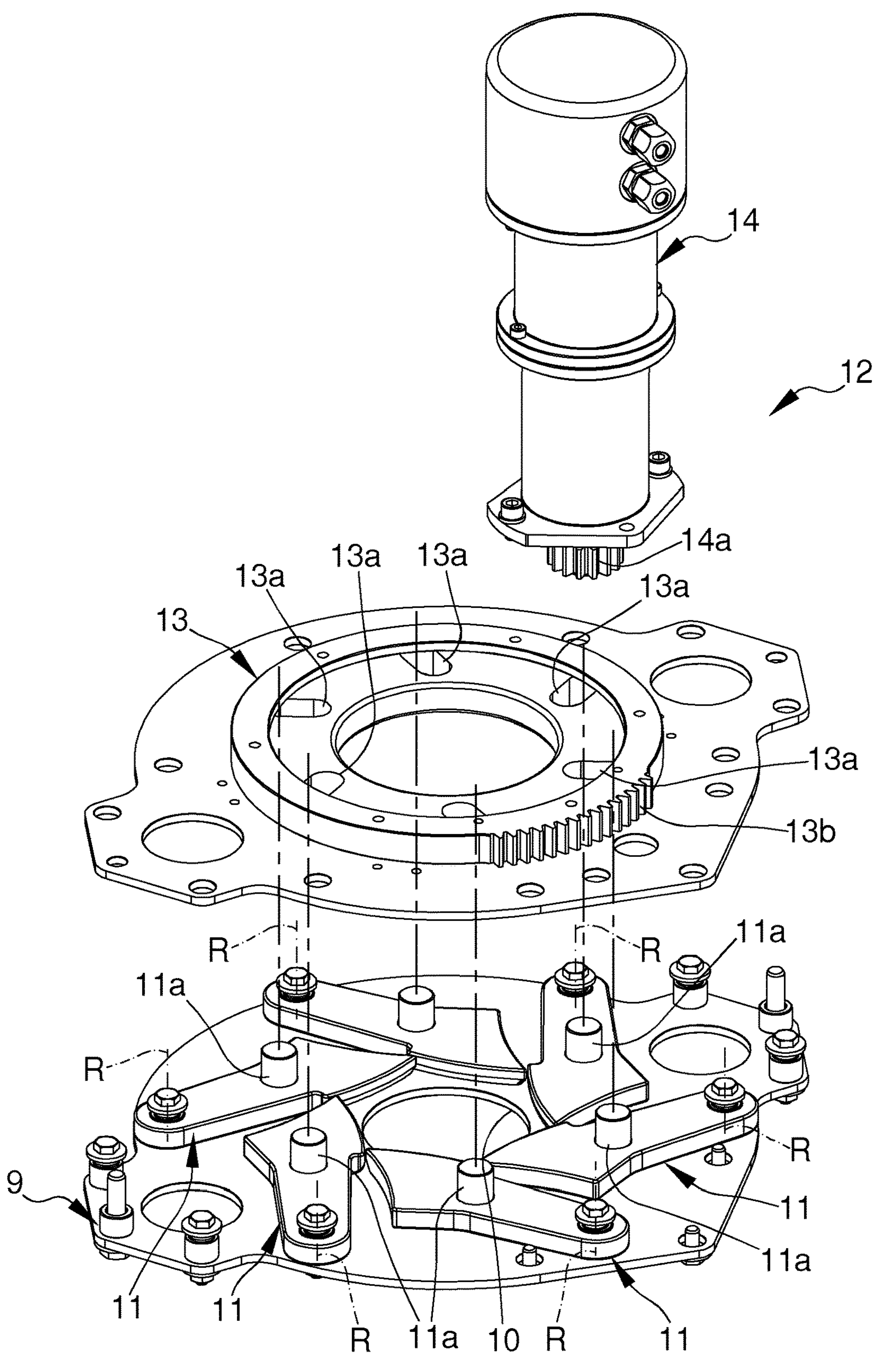
FIG. 3 is an exploded view of a component of the equipment according to the invention.
Figures 4, 5, 6, 7:
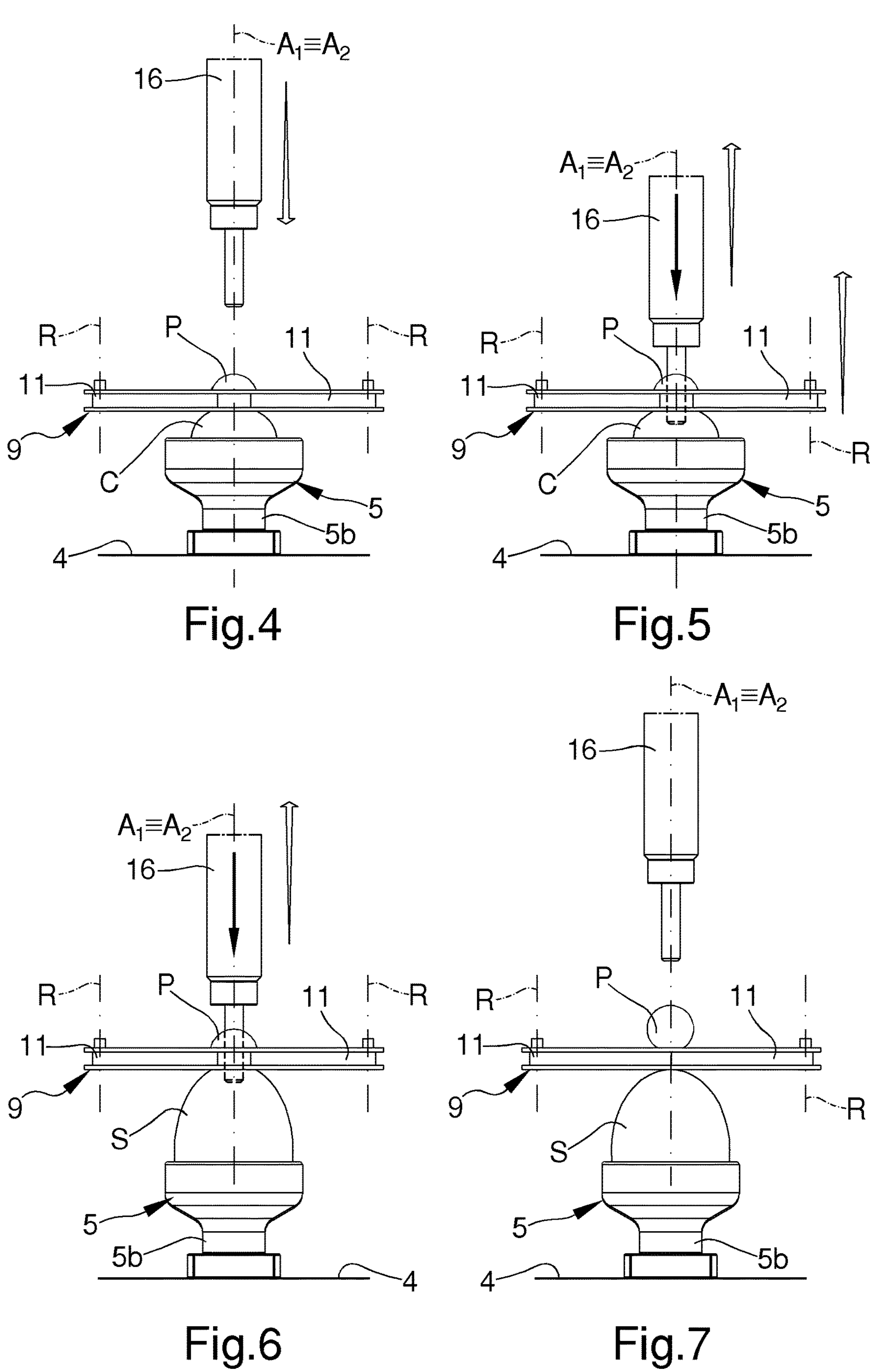
FIGS. 4, 5, 6 and 7 are schematic representations of the equipment according to the invention in different configurations of use.

In the embodiment shown in FIGS. 1 to 7, the first tub 19*a* and the second tub 19*b* are aligned along the direction of forward movement D so that the first tub 19*a* is placed in the immediate vicinity of the supporting plane 4.

The special solution of providing a container element 5 provided with the stem 5*b* allows, as a result of the movement of the supporting plane 4 at the unloading station, the portion P to fall into the first tub 19*a* and the stuffed cheese S to fall into the second tub 19*b*.

It cannot however be ruled out that the equipment 1 comprises an individual cooling tub and that the separation of the stuffed cheese S and the portions P is carried out at a later date.

Advantageously, the equipment 1 comprises movement means 20, 21 adapted to move at least one of either the supporting means 3, the gripping means 6 or the filling means 7.

In particular, the movement means 20, 21 comprise at least one mutual movement unit 20 between the gripping means 6 and the filling means 7, and at least one mutual movement assembly 21 between the supporting means 3 and the gripping means 6.

The mutual movement unit 20 is adapted to move at least one of either the supporting means 3 or the gripping means 6 with respect to the other along an axis of travel A1 substantially perpendicular to the supporting plane 4.

In essence, the mutual movement unit 20 has the function of approaching or moving away the supporting means 3 to/from the gripping means 6 in order to allow retaining the cheese C by the diaphragm device 9.

In the embodiment shown in the figures, the mutual movement unit is adapted to move the gripping means 6 with respect to the supporting means 3.

The mutual movement unit 20 also has the function of moving the diaphragm device 9 away from the container element 5 during filling by the filling means 7.

During this phase, in fact, the cheese C tends to deform to make room for the stuffing, thus increasing in volume.

The mutual movement unit 20 comprises a driving unit 22 operationally connected to the gripping frame 8 and a guidance unit 23 associated with the base frame 2 and extending along the axis of travel A1.

The gripping frame 8 is associated with the guidance unit 23 in a sliding manner.

The driving unit 22 comprises a rack-and-pinion element 22*a*, associated with the gripping frame 8, substantially parallel to the guidance unit 23, and an actuating device 22*b*, of the type of an electric motor, connected to the rack-and-pinion element itself and adapted to move the gripping frame 8 on the guidance unit 23.

The mutual movement assembly 21 is adapted to move at least one of either the gripping means 6 or the filling means 7 with respect to the other along an axis of sliding A2 substantially perpendicular to the supporting plane 4.

In other words, the mutual movement assembly 21 has the function of bringing the filling means 7 and the gripping means 6 close to or further away from each other to allow the injector device 16 to be inserted into and removed from the portion P.

In the embodiment shown in the figures, the mutual movement assembly 21 is adapted to move the filling means 7 with respect to the gripping means 6.

The mutual movement assembly 21 also has the function of moving the injector device 16 from the container element 5 during filling, substantially at the same time as the gripping means 6, in order to facilitate the deformation of the cheese C.

The mutual movement assembly 21 comprises a motor assembly 24 operationally connected to the filling frame 15 and a guidance assembly 25 associated with the base frame 2 and extending along the axis of sliding A2.

The filling frame 15 is associated with the guidance assembly 25 in a sliding manner.

The motor assembly 24 comprises at least one rack-and-pinion body 24*a*, associated with the filling frame 15, which is substantially parallel to the guidance assembly 25, and an actuating element 24*b*, of the type of an electric motor, connected to the rack-and-pinion body itself and adapted to move the filling frame 15 on the guidance assembly 25.

Conveniently, the guidance assembly 25 coincides with the guidance unit 23 and the axis of sliding A2 coincides with the axis of travel A1.

In other words, the filling frame 15 and the gripping frame 8 are arranged one on top of the other, mounted on the same rails and movable along the same axis as the supporting means 3.

The equipment 1 also comprises an electronic control system 26 provided with at least one electronic unit 26*a* configured to operate at least one of either the supporting means 3, the gripping means 6, the filling means 7, the mutual movement unit 20 or the mutual movement assembly 21.

The electronic control system 26 also comprises at least one position sensor 26*b* operationally connected to the electronic unit 26*a* and configured to determine at least one position of at least one of either the connecting element 13, the gripping frame 8 or the filling frame 15.

The operation of the equipment 1 according to the invention is as follows.

Initially, the container element 5 is positioned in the loading station where the cheese C is loaded into the housing 5*a*.

The container element 5 is then transferred by means of the supporting plane 4, along the direction of forward movement D, towards the filling station.

At this point, the mutual movement unit 20 moves the gripping means 6 towards the supporting means 3.

In particular, the driving unit 22 brings the diaphragm device 9 closer to the cheese C so that the latter can transit through the passage hole 10.

The actuating body 14 of the rotational means 12 is operated by determining the rotation of the gripping elements 11 towards the working position, partly closing the passage hole 10 and retaining the portion P.

The mutual movement assembly 21 moves the filling means 7 towards the gripping means 6.

In particular, the motor assembly 24 brings the injector device 16 closer to the diaphragm device 9 so as to allow the injector device itself to be inserted into the cheese C through the portion P.

The pumping device 18 is operated to allow the stuffing to be delivered.

During this phase, the mutual movement unit 20 and the mutual movement assembly 21 move the gripping means 6 and the filling means 7 away at the same time from the supporting means 3, respectively, in order to facilitate the deformation of the cheese C.

At the end of the delivery, the mutual movement assembly 21 moves the filling means 7 away from the gripping means 6 to allow the injector device 16 to be pulled out of the portion P.

At this point, the gripping elements 11 are moved towards the sealing position to apply pressure on the portion P and close the stuffed cheese S.

If necessary, the gripping elements 11 are further rotated towards the cutting position to remove the portion P from the stuffed cheese S.

Then, the gripping elements 11 are brought to the home position to release the stuffed cheese S, and, if necessary, the removed portion P, onto the supporting means 3.

The supporting plane 4 displaces the stuffed cheese S, and, if necessary, the removed portion P, towards the unloading station where they are transferred to the respective tubs 19*a* and 19*b*.

Figure 8:
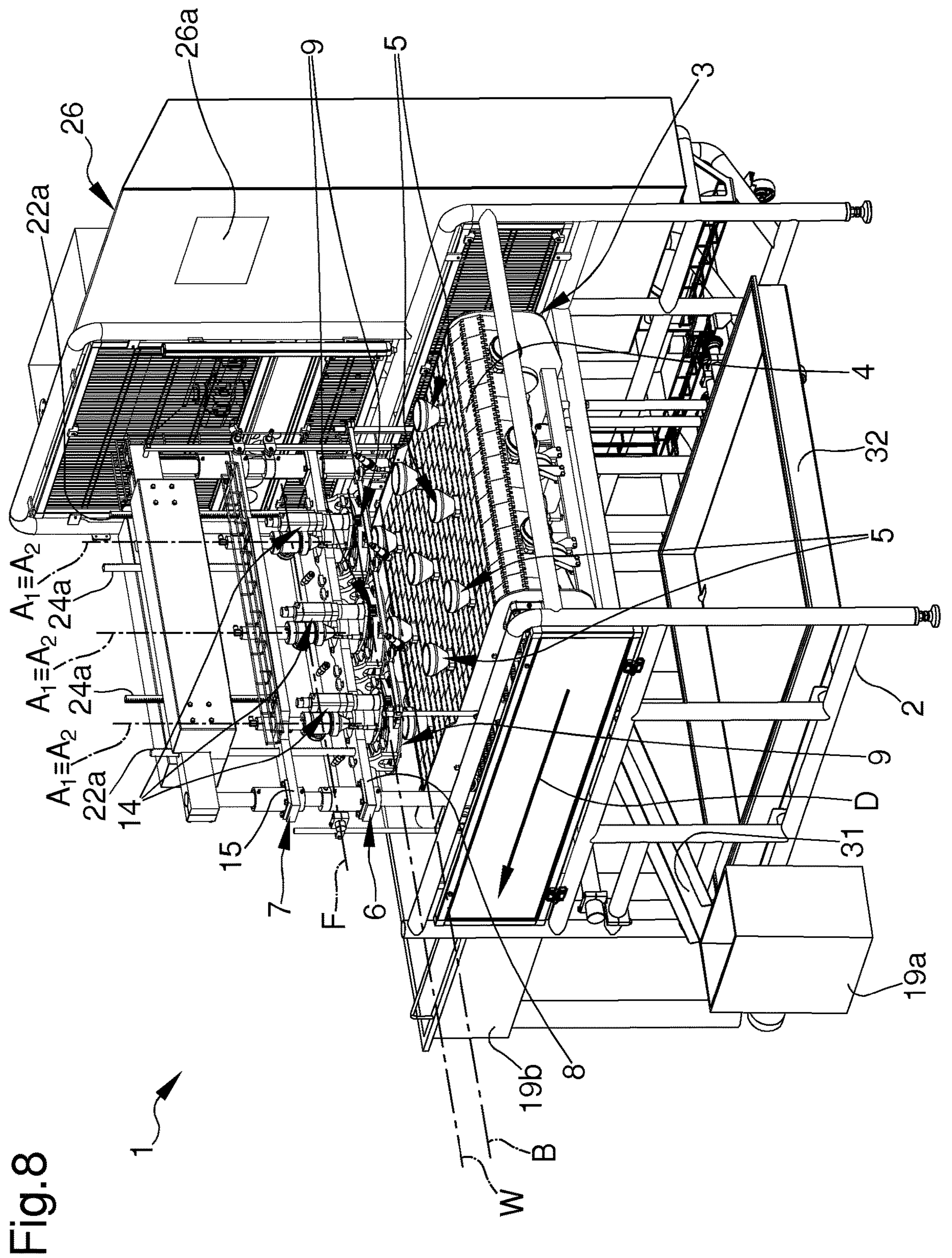
FIG. 8 is an axonometric view of a second embodiment of the equipment according to the invention.
Figure 9:
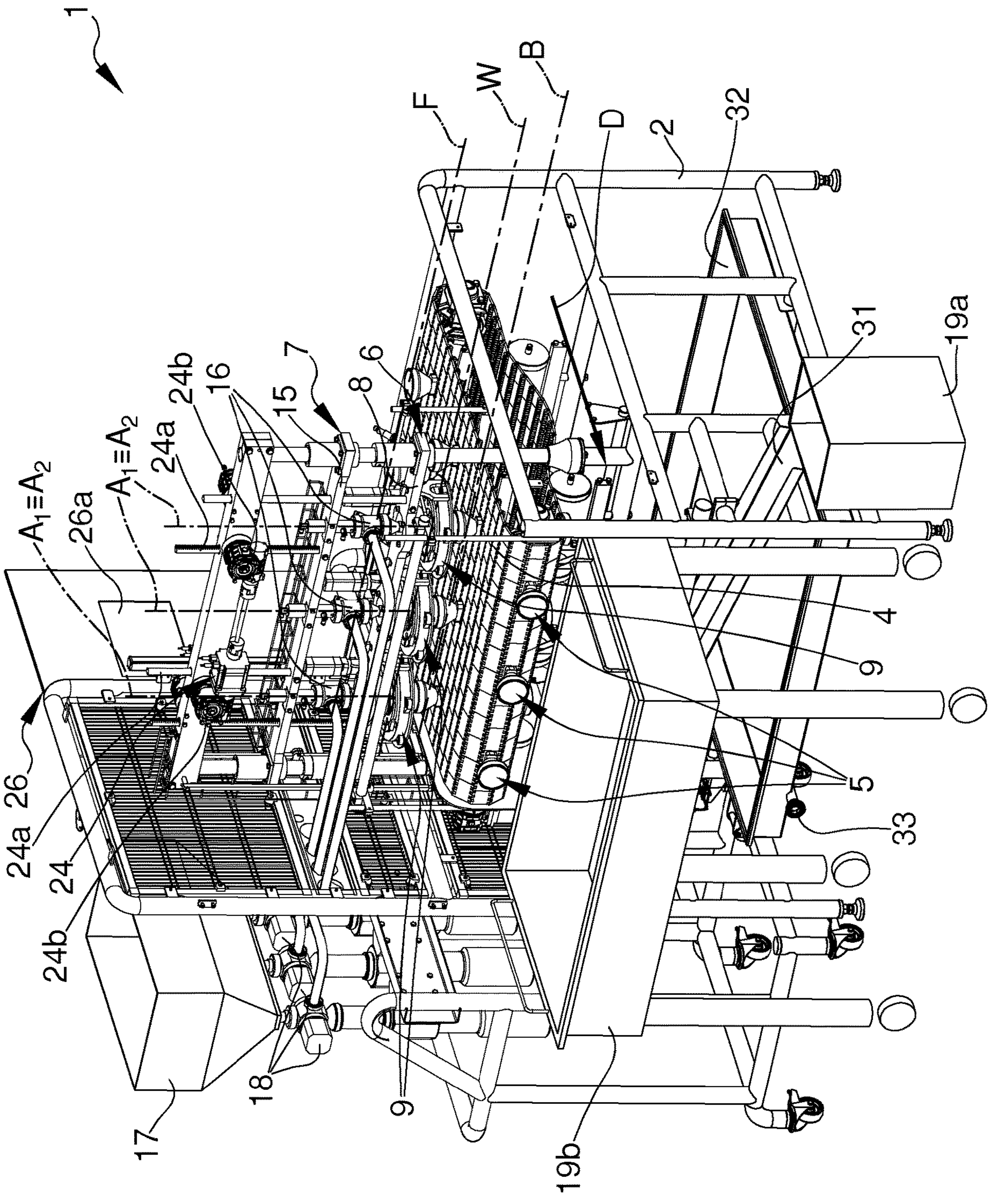
FIG. 9 is an axonometric view of the equipment in FIG. 8, from a different angle.
Figure 10:
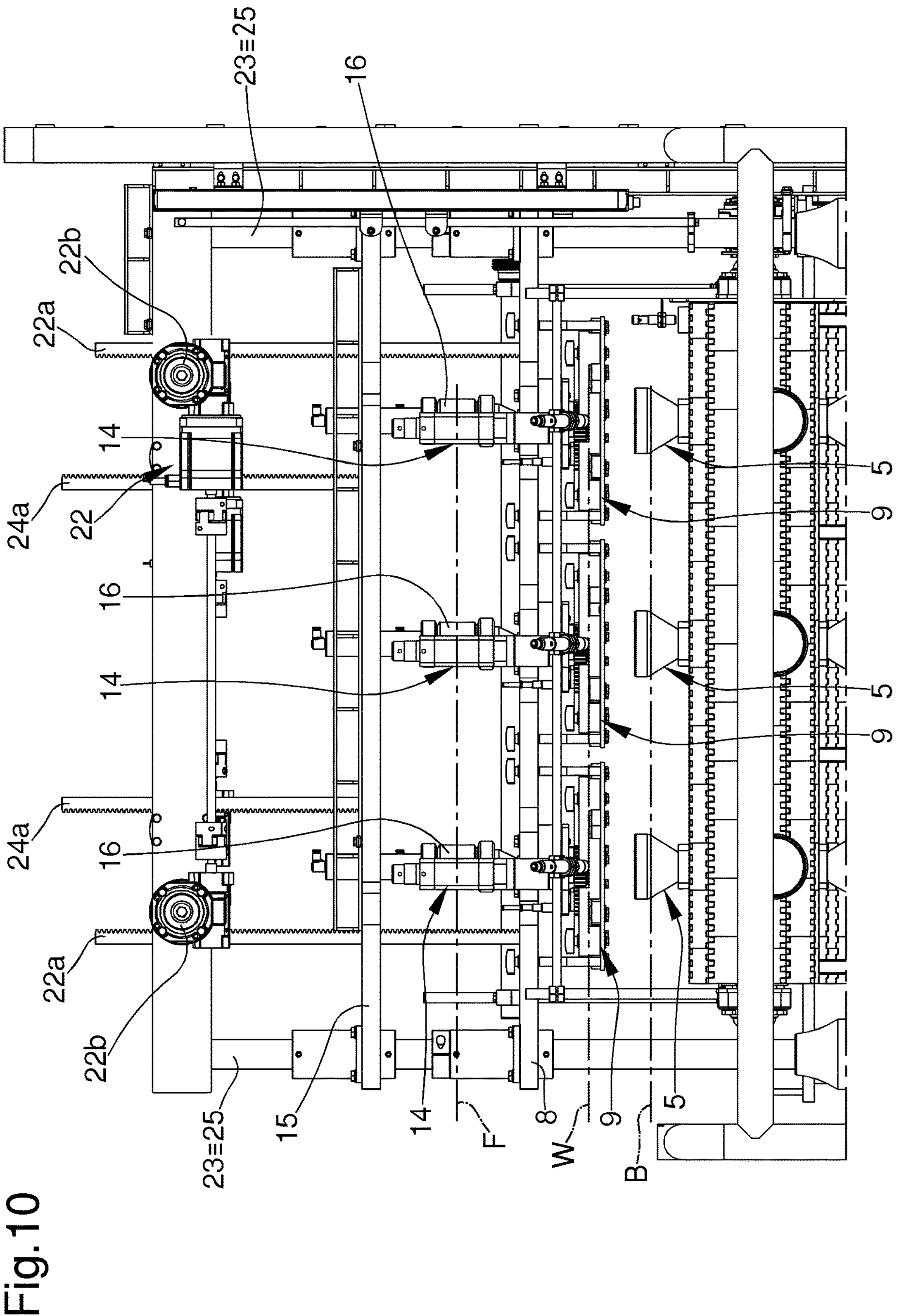
FIG. 10 is a detailed side view of the equipment in FIG. 8.
Figure 11:
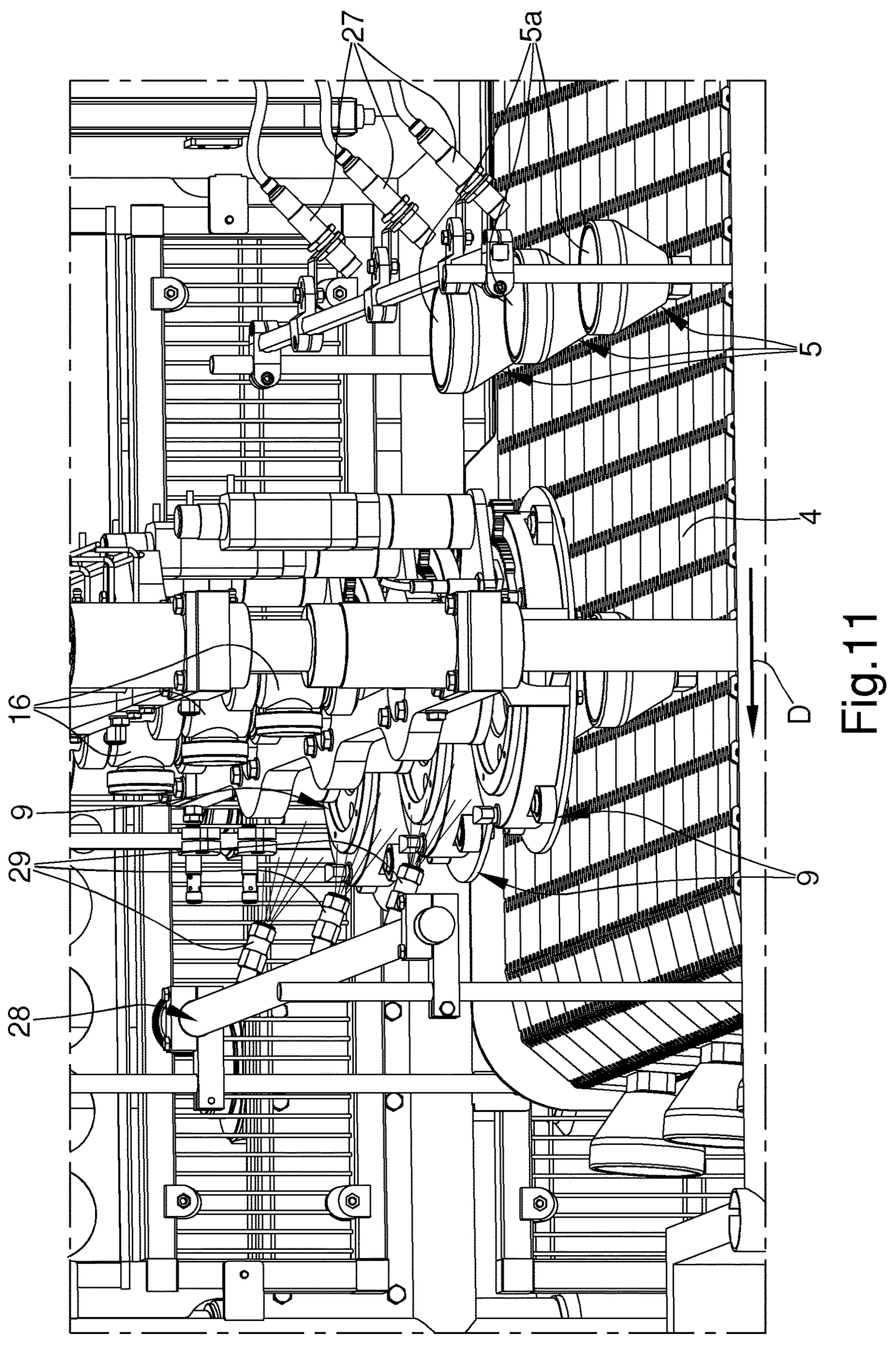
FIGS. 11 and 12 are detailed axonometric views of the equipment in FIG. 8.
Figure 12:
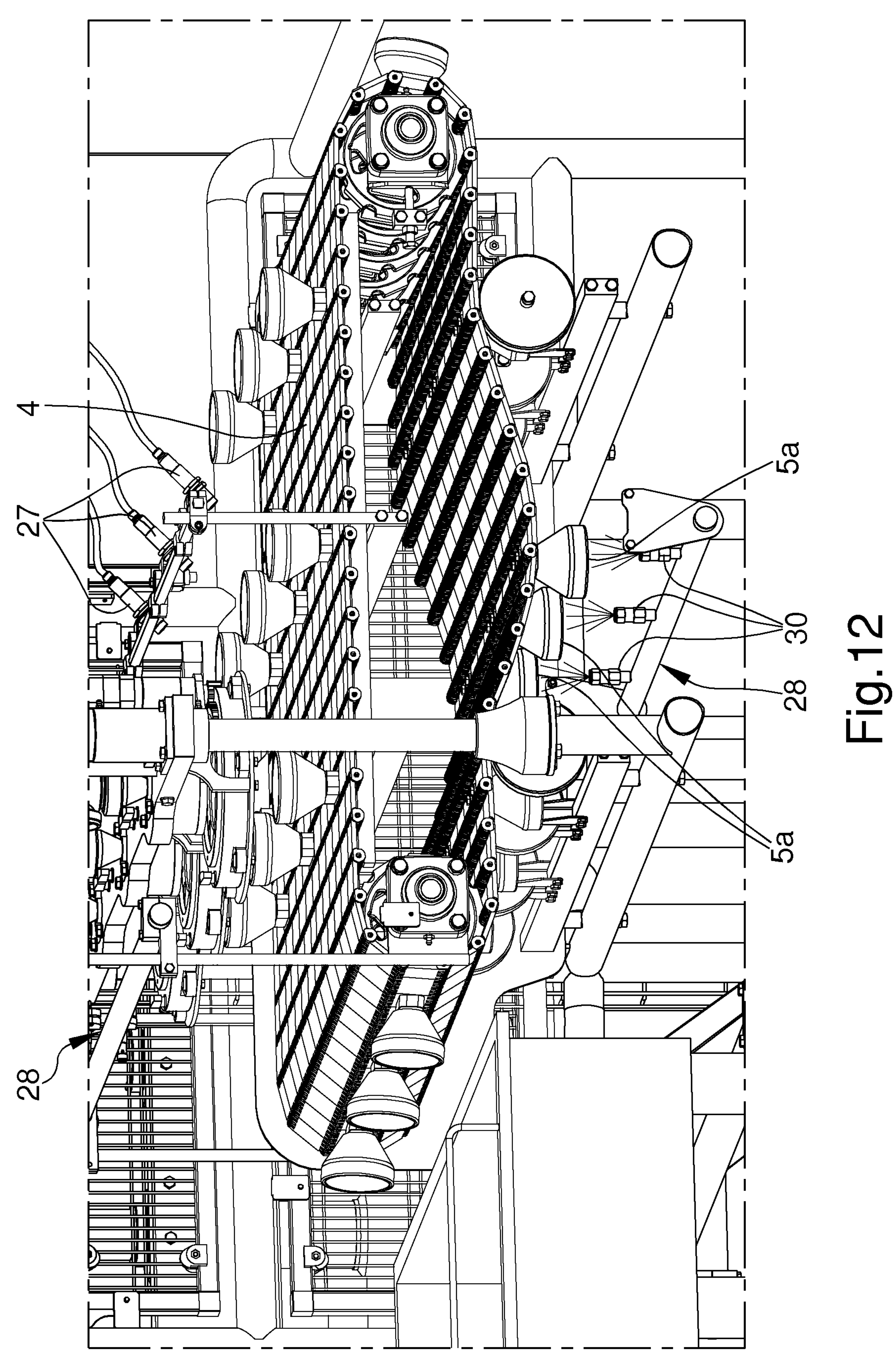

According to a second embodiment, shown in FIGS. 8 to 12, the gripping means 6 comprise a plurality of diaphragm devices 9 associated with the gripping frame 8 and arranged side by side along at least one working direction W transverse to the direction of forward movement D.

Preferably, the working direction W is substantially orthogonal to the direction of forward movement D.

Alternative embodiments cannot however be ruled out wherein the working direction is substantially oblique to the direction of forward movement and/or wherein the diaphragm devices 9 are arranged along several working directions W in a staggered manner.

Each of the diaphragm devices 9 is adapted to retain a respective cheese C.

This embodiment provides, appropriately, that the supporting means 3 comprise a plurality of container elements 5 at least partly arranged side by side along at least one positioning direction B parallel to the working direction W.

Specifically, the container elements 5 are arranged on the supporting plane 4 in several sequences that extend along the direction of forward movement D and are positioned side by side along their respective positioning directions B.

Conveniently, each diaphragm device 9 comprises a respective actuating body 14.

The diaphragm devices 9 can, therefore, be operated independently of each other to retain/release the cheese C.

This way, only the diaphragm devices 9 actually required can be operated.

In addition, it is possible to provide that in some diaphragm devices 9 the gripping elements 11 are moved between the home position and the sealing position, while in other diaphragm devices 9 the gripping elements 11 are moved between the home position and the cutting position, in order to obtain stuffed cheese S provided with the portion P and without the portion P, respectively.

Again with reference to this second embodiment, the filling means 7 comprise a plurality of injector devices 16 connected in a fluid-operated manner to the tank 17, which filling means are associated with the filling frame 15 and arranged side by side along at least one operating direction F transverse to the direction of forward movement D.

Preferably, the operating direction F is substantially orthogonal to the direction of forward movement D.

Advantageously, the operating direction F is substantially parallel to the working direction W.

Even more preferably, the operating direction F and the working direction W extend substantially horizontally and rest one on top of the other on the same substantially vertical plane.

Appropriately, each diaphragm device 9 corresponds to an injector device 16.

Each of the injector devices 16 is adapted to inject the stuffing into a respective cheese C.

Each injector device 16 is conveniently connected to a respective pumping device 18.

The injector devices 16 can therefore be operated independently of each other to deliver the stuffing.

This way, each injector device 16 delivers the stuffing only if actually needed, i.e. if the corresponding diaphragm device 9 has closed to retain the cheese C.

In addition, it is possible to provide for the injector devices 16 to deliver different quantities of stuffing in order to obtain stuffed cheese S of different types.

The equipment 1 according to the second embodiment allows, therefore, the processing of several cheeses C at the same time and the production of stuffed cheese S of different types.

In particular, the solution of providing the diaphragm devices 9 associated with an individual gripping frame 8 and the injector devices 16 associated with an individual filling frame 15 allows them to be moved simultaneously by means of the driving unit 22 and the motor assembly 24, respectively.

This solution allows reducing the number of components and movable parts, making the equipment 1 extremely compact and provided with an agile operation.

As shown in FIGS. 8 to 12, the equipment 1 also comprises at least one presence sensor 27 configured to detect the presence of the cheese C inside the container element 5.

In more detail, the presence sensor 27 is configured to detect the presence of the cheese C with the container element 5 positioned in a detection station, between the loading station and the filling station.

The presence sensor 27 is of the type, e.g., of a diffuse reflection photocell.

The injector device 16 is interlocked to the presence sensor 27 to deliver the stuffing only in the presence of the cheese C in the container element 5.

In particular, the equipment 1 comprises a presence sensor 27 for each injector device 16.

The presence sensors 27 are operationally connected to the electronic unit 26*a*.

If the presence sensor 27 detects the presence of the cheese C in its respective housing 5*a*, the electronic unit 26*a* is programmed to operate the pumping device 18 of the corresponding injector device 16.

If, on the other hand, the presence sensor 27 does not detect the presence of the cheese C, the pumping device 18 of the corresponding injector device 16 is not operated so as not to deliver the stuffing.

It cannot be ruled out that the presence sensor 27 can also be applied to the equipment 1 in accordance with the first embodiment shown in FIGS. 1 to 7.

Always with reference to FIGS. 8 to 12, the equipment 1 comprises cleaning means 28 associated with the base frame 2 and adapted to deliver at least one cleaning fluid to at least the gripping means 6.

The cleaning fluid is of the type, e.g., of hot water and/or a sanitizing product. More specifically, the cleaning means 28 comprise at least one delivering element 29 configured to direct a jet of cleaning fluid towards the diaphragm device 9.

The delivering element 29 has the function of removing any residual cheese C and/or stuffing that remains on the diaphragm device 9 as a result of the preparation of the stuffed cheese S.

The cleaning means 28 comprise at least one delivering element 29 for each diaphragm device 9.

The cleaning means 28 also comprise a dispensing element 30 configured to direct the jet of cleaning fluid towards the container element 5.

In more detail, the dispensing element 30 delivers the cleaning fluid towards the housing 5*a*.

The dispensing element 30 has the function of cleaning the housing 5*a* after unloading the stuffed cheese S and before positioning a new cheese C thereon.

In detail, the movement of the supporting plane 4 allows positioning the container element 5 in a cleaning station wherein it is cleaned before starting a new processing cycle.

The dispensing element 30 is associated with the base frame 2 below the supporting plane 4.

Specifically, in the cleaning station, the container element 5 is provided with the housing 5*a* facing downwards and the dispensing element 30 delivers the cleaning fluid upwards.

This way, after that the housing 5*a* has been cleaned, the cleaning fluid flows downwards by gravity.

The operation, therefore, does not require for an additional phase of emptying the container element 5 from the detergent fluid to start a new processing cycle. The cleaning means 28 comprise a dispensing element 30 for each container element 5 arranged along the positioning direction B.

The cleaning means 28, therefore, allow the cleaning of the diaphragm devices 9 and of the container elements 5 at each processing cycle.

It cannot be ruled out that the cleaning means 28 may also be applied to the equipment 1 according to the first embodiment shown in FIGS. 1 to 7.

For the collection and recovery of the cleaning fluid delivered by the cleaning means 28, the equipment 1 comprises a collection tank 32 located below the supporting plane 4, conveniently below the cleaning station.

Clearly, any stuffing that has not been correctly injected into the cheeses C by the injector devices 16 is also collected in the collection tank 32.

All products collected in the collection tank 32 can be drained therefrom (e.g. by suction through a union 33) to be possibly recovered and/or to be definitively discarded.

In the second embodiment, moreover, the separation of the stuffed cheese S and of the portions P is carried out using an alternative method to that described above.

In more detail, as shown in the figures, the second tub 19*b*, intended to contain the stuffed cheese S is arranged along the direction of forward movement D at the supporting plane 4 and receives the stuffed cheese S when the supporting plane itself moves forward.

The first tub 19*a*, intended to contain the portions P, on the other hand, is placed laterally to the supporting plane 4, at the base of the equipment 1. By means of a slide 31, placed below the supporting plane 4, the portions P are conveyed by gravity from the supporting plane 4 to the first tub 19*a* as the supporting plane 4 moves forward. To facilitate the descent of the portions P along the slide 31, a nozzle can be conveniently provided which is adapted to deliver a jet of water along the slide 31.

It has in practice been ascertained that the described invention achieves the intended objects and in particular it is underlined that the equipment for the production of stuffed cheese, particularly burrata cheese, allows reducing the processing time and costs related thereto.

The presence of a plurality of diaphragm devices and injector devices makes it possible to further reduce processing times and at the same time to produce stuffed cheese of different types.

Moreover, the equipment according to the invention allows the production of stuffed cheese, particularly burrata cheese, in a totally automated manner in order to avoid the use of skilled labor.

It follows, furthermore, that the equipment according to the invention allows producing stuffed cheese quickly and minimizing the risk of bacterial contamination.

The invention claimed is:

1. An equipment (1) for the production of stuffed cheese, particularly burrata cheese, wherein said equipment (1) comprises:

at least one base frame (2);

supporting means (3) for a cheese (C) of the fresh "pasta filata" type associated with said base frame (2);

gripping means (6) for said cheese (C) associated with said base frame (2) and adapted to retain at least one portion (P) of said cheese (C);

filling means (7) of said cheese (C) associated with said base frame (2) and adapted to inject a filling into said cheese (C) through said portion (P) to obtain a stuffed cheese (S);

at least one mutual movement unit (20); and at least one mutual movement assembly (21);

wherein said supporting means (3) comprise a supporting plane (4) movable on said base frame (2) along a direction of forward movement (D);

wherein said supporting means (3) comprise at least one container element (5) for supporting said cheese (C) associated with said supporting plane (4) and adapted to accommodate said cheese (C);

wherein said supporting means (3) comprise a plurality of said container elements (5) associated with said supporting plane (4) and adapted to house a plurality of cheeses (C);

wherein said mutual movement unit (20) is adapted to move at least one of either said supporting means (3) or said gripping means (6) with respect to the other alone an axis of travel (A1) perpendicular to said supporting plane (4);

wherein said mutual movement assembly (21) is adapted to move at least one of either said gripping means (6) or said filling means (7) with respect to the other along an axis of sliding (A2) perpendicular to said supporting plane (4).

2. The equipment (1) according to claim 1, wherein said gripping means (6) comprise at least one gripping frame (8) associated with said base frame (2) and at least one diaphragm device (9) associated with said gripping frame (8) and closable around said cheese (C) to retain said portion (P) and openable to release said stuffed cheese (S).

3. The equipment (1) according to claim 2, wherein said gripping means (6) comprise a plurality of said diaphragm devices (9) associated with said gripping frame (8) arranged side by side along at least one working direction (W) transverse to said direction of forward movement (D), each adapted to retain a respective cheese (C), said container elements (5) being at least partly arranged side by side along at least one positioning direction (B) parallel to said working direction (W).

4. The equipment (1) according to claim 1, wherein said filling means (7) comprise:

at least one filling frame (15) associated with said base frame (2);

at least one injector device (16) associated with said filling frame (15) and adapted to inject said filling into said cheese (C); and at least one tank (17) adapted to contain said filling, connected to said injector device (16) in a fluid-operated manner.

5. The equipment (1) according to claim 4, wherein said filling means (7) comprise a plurality of said injector devices (16) connected in a fluid-operated manner to said tank (17), which injector devices (16) are associated with said filling frame (15) and arranged side by side along at least one operating direction (F) transverse to said direction of forward movement (D), each adapted to inject said stuffing in a respective cheese (C).

6. The equipment (1) according to claim 1, wherein:

said gripping means (6) comprise at least one gripping frame (8) associated with said base frame (2) and at least one diaphragm device (9) associated with said gripping frame (8) and closable around said cheese (C) to retain said portion (P) and openable to release said stuffed cheese (S); and said mutual movement unit (20) comprises a driving unit (22) operationally connected to said gripping frame (8) and a guidance unit (23) associated with said base frame (2) and extending along said axis of travel (A1), said gripping frame (8) being associated by sliding with said guidance unit (23).

7. The equipment (1) according to claim 1, wherein said filling means (7) comprise:

at least one filling frame (15) associated with said base frame (2);

at least one injector device (16) associated with said filling frame (15) and adapted to inject said filling into said cheese (C); and at least one tank (17) adapted to contain said filling, connected to said injector device (16) in a fluid-operated manner;

and wherein said mutual movement assembly (21) comprises a motor assembly (24) operationally connected to said filling frame (15) and a guidance assembly (25) associated with said base frame (2) and extending along said axis of sliding (A2), said filling frame (15) being associated sliding with said guidance assembly (25).

8. The equipment (1) according to claim 1, wherein:

said mutual movement unit (20) is adapted to move at least one of either said supporting means (3) or said gripping means (6) with respect to the other along an axis of travel (A1) perpendicular to said supporting plane (4);

said gripping means (6) comprise at least one gripping frame (8) associated with said base frame (2) and at least one diaphragm device (9) associated with said gripping frame (8) and closable around said cheese (C) to retain said portion (P) and openable to release said stuffed cheese (S);

said mutual movement unit (20) comprises a driving unit (22) operationally connected to said gripping frame (8) and a guidance unit (23) associated with said base frame (2) and extending along said axis of travel (A1), said gripping frame (8) being associated by sliding with said guidance unit (23);

said mutual movement assembly (21) is adapted to move at least one of either said gripping means (6) or said filling means (7) with respect to the other along an axis of sliding (A2) perpendicular to said supporting plane (4);

said filling means (7) comprise:

at least one filling frame (15) associated with said base frame (2);

at least one injector device (16) associated with said filling frame (15) and adapted to inject said filling into said cheese (C); and at least one tank (17) adapted to contain said filling, connected to said injector device (16) in a fluid-operated manner;

said mutual movement assembly (21) comprises a motor assembly (24) operationally connected to said filling frame (15) and a guidance assembly (25) associated with said base frame (2) and extending along said axis of sliding (A2), said filling frame (15) being associated sliding with said guidance assembly (25);

said guidance assembly (25) coincides with said guidance unit (23) and said axis of sliding (A2) coincides with said axis of travel (A1).

9. The equipment (1) according to claim 1, wherein said filling means (7) comprise:

at least one filling frame (15) associated with said base frame (2);

at least one injector device (16) associated with said filling frame (15) and adapted to inject said filling into said cheese (C); and at least one tank (17) adapted to contain said filling, connected to said injector device (16) in a fluid-operated manner;

and wherein said equipment (1) comprises at least one presence sensor (27) configured to detect the presence of said cheese (C) inside said container element (5), said injector device (16) being interlocked to said presence sensor (27) to deliver said stuffing only in the presence of said cheese (C) in said container element (5).

10. An equipment (1) for the production of stuffed cheese, particularly burrata cheese, wherein said equipment (1) comprises:

at least one base frame (2);

supporting means (3) for a cheese (C) of the fresh "pasta filata" type associated with said base frame (2);

gripping means (6) for said cheese (C) associated with said base frame (2) and adapted to retain at least one portion (P) of said cheese (C);

filling means (7) of said cheese (C) associated with said base frame (2) and adapted to inject a filling into said cheese (C) through said portion (P) to obtain a stuffed cheese (S);

at least one mutual movement unit (20); and at least one mutual movement assembly (21);

wherein said supporting means (3) comprise a supporting plane (4) movable on said base frame (2) along a direction of forward movement (D);

wherein said mutual movement unit (20) is adapted to move at least one of either said supporting means (3) or said gripping means (6) with respect to the other along an axis of travel (A1) perpendicular to said supporting plane (4);

wherein said mutual movement assembly (21) is adapted to move at least one of either said gripping means (6) or said filling means (7) with respect to the other along an axis of sliding (A2) perpendicular to said supporting plane (4);

wherein said gripping means (6) comprise at least one gripping frame (8) associated with said base frame (2) and at least one diaphragm device (9) associated with said gripping frame (8) and closable around said cheese (C) to retain said portion (P) and openable to release said stuffed cheese (S);

wherein said diaphragm device (9) comprises:

a plurality of gripping elements (11) associated with said gripping frame (8), arranged along a circumference and mutually movable in rotation around respective axes of rotation (R) between at least one operating position, wherein said gripping elements (11) are approached to a centre of said circumference to intercept said cheese (C) and to retain said portion (P), and a home position, wherein gripping elements (11) are moved away from said centre to release said stuffed cheese (S); and rotational means (12) of said gripping elements (11) between at least said operating position and said home position, comprising at least one connecting element (13) associated with said gripping elements (11) and at least one actuating body (14) operationally connected to said connecting element (13) by means of a gear wheel (14*a*) adapted to mesh on a respective toothed portion (13*b*) defined on said connecting element (13), the rotation of said gear wheel (14*a*) in the two directions of rotation, thus determining the movement of said gripping elements (11) between said operating position and said home position.

11. An equipment (1) for the production of stuffed cheese, particularly burrata cheese, wherein said equipment (1) comprises:

at least one base frame (2);

supporting means (3) for a cheese (C) of the fresh "pasta filata" type associated with said base frame (2);

gripping means (6) for said cheese (C) associated with said base frame (2) and adapted to retain at least one portion (P) of said cheese (C);

filling means (7) of said cheese (C) associated with said base frame (2) and adapted to inject a filling into said cheese (C) through said portion (P) to obtain a stuffed cheese (S);

at least one mutual movement unit (20); and at least one mutual movement assembly (21);

wherein said supporting means (3) comprise a supporting plane (4) movable on said base frame (2) along a direction of forward movement (D);

wherein said mutual movement unit (20) is adapted to move at least one of either said supporting means (3) or said gripping means (6) with respect to the other alone an axis of travel (A1) perpendicular to said supporting plane (4);

wherein said mutual movement assembly (21) is adapted to move at least one of either said gripping means (6) or said filling means (7) with respect to the other along an axis of sliding (A2) perpendicular to said supporting plane (4);

wherein said equipment (1) comprises cleaning means (28) associated with said base frame (2) and adapted to deliver at least one cleaning fluid to at least said gripping means (6).

12. The equipment (1) according to claim 11, wherein said supporting means (3) comprise at least one container element (5) for supporting said cheese (C) associated with said supporting plane (4) and adapted to accommodate said cheese (C); and wherein said supporting means (3) comprise a plurality of said container elements (5) associated with said supporting plane (4) and adapted to house a plurality of cheeses (C).

13. The equipment (1) according to claim 11, wherein said gripping means (6) comprise at least one gripping frame (8) associated with said base frame (2) and at least one diaphragm device (9) associated with said gripping frame (8) and closable around said cheese (C) to retain said portion (P) and openable to release said stuffed cheese (S).

14. The equipment (1) according to claim 13, wherein said gripping means (6) comprise a plurality of said diaphragm devices (9) associated with said gripping frame (8) arranged side by side along at least one working direction (W) transverse to said direction of forward movement (D), each adapted to retain a respective cheese (C), wherein said supporting means (3) comprise at least one container element (5) for supporting said cheese (C) associated with said supporting plane (4), said container elements (5) being at least partly arranged side by side along at least one positioning direction (B) parallel to said working direction (W).

15. The equipment (1) according to claim 13, wherein:

said mutual movement unit (20) comprises a driving unit (22) operationally connected to said gripping frame (8) and a guidance unit (23) associated with said base frame (2) and extending along said axis of travel (A1), said gripping frame (8) being associated by sliding with said guidance unit (23); and said driving unit (22) comprises a rack-and-pinion element (22*a*) associated with said gripping frame (8), substantially parallel to said guidance unit (23), and an actuating device (22*b*) connected to said rack-and-pinion element (22*a*) and adapted to move said gripping frame (8) on said guidance unit (23).

* * * * *